UNITED STATES PATENT OFFICE.

ROBERT J. O'BRIEN, JR., OF BELLEVILLE, NEW JERSEY, ASSIGNOR TO COLLWAY LABORATORIES, INC., OF NEWARK, NEW JERSEY, A CORPORATION OF NEW JERSEY.

METHOD OF WEIGHTING SILK AND THE PRODUCT THEREOF.

No Drawing.   Application filed December 16, 1924.   Serial No. 756,365.

The common practice in weighting silk fabrics is to apply to the threads a metallic solution, one of tin chloride ordinarily. This is a treatment objectionable from the standpoints of cost and harmful effects on the piece of silk. By my invention the cost of weighting is reduced very substantially, and not only is the silk not harmed in any way, but on the contrary beneficial results are secured.

I describe hereinafter what I regard as a most satisfactory embodiment and way of practicing my invention, but for the purpose of protection it is to be understood that my invention consists in what is described by or is included within the terms or meaning of the appended claims.

I have found that an organic material such as latex of the rubber plant in an aqueous solution applied to silk threads, is taken up or absorbed thereby and imparts the desired weight thereto, the weight imparted depending upon the strength of the solution.

Preferably the solution may contain some inorganic material, oxides of tin, or zinc for example, and when used with rubber assists the vulcanization thereof, which is a part of the treatment of the silk, the latter after removal from the weighting colloidal solution being heated to effect vulcanizing, a small quantity of sulfur in a colloidal state being added for vulcanizing.

Both the organic and the inorganic substances are colloidalized or in a collodial state at the time of application to the silk. The two colloidal solutions of organic and inorganic substances may be mixed before treatment of the silk or the silk may be first passed through a colloidal solution of inorganic material and then through a latex or other organic solution. The latex or other equivalent solution serves as a seal that holds the oxide permanently to the silk.

The proportions of the organic and inorganic material will vary according to the fineness or coarseness of the weave, the coarser the weave the less the proportion of inorganic. For example, tin or zinc oxide may vary in the proportion of from 10 to 50 percent of rubber by weight.

Treated with rubber there is no tendency of the silk to crack as in the case of metal and it makes the fibers more elastic and flexible and of greater tensile strength than silk has naturally, or weighted with metal.

By my invention no acid being used, as is the case with the ordinary weighting substance there is no danger of damage to the silk which exists in such ordinary weighting treatment from failure to remove the acid from the silk. I reduce the substance used in my treatment physically to a colloidal solution, containing no acid. No acid being present that must be removed by repeated washings and with great quantities of water and much handling, my treatment means a very great saving in the weighting treatment of silk.

My treatment can be employed with silk either in the skein or the piece, but preferably in the piece.

What I claim is:

1. The method of treating silk which consists in weighting the same applying to silk threads rubber in solution the rubber at the time of application being in a colloidal state.

2. The method of treating silk which consists in applying to silk rubber in a colloidal state and a colloidal solution, the colloids being of an inorganic substance of a nature not hurtful to silk.

3. The method of treating silk which consists in subjecting the silk to two colloidal solutions, one of which is of rubber and the other is of an inorganic substance of a nature not hurtful to silk and compatible with rubber in a colloidal state.

4. An article of manufacture consisting of silk fabric weighted with a rubber substance in a colloidal state.

5. An article of manufacture consisting of silk fabric weighted with rubber incorporated in the threads thereof.

In testimony whereof I hereunto affix my signature.

ROBERT J. O'BRIEN, JR.